(12) United States Patent
Hopperdietzel

(10) Patent No.: US 12,491,929 B2
(45) Date of Patent: Dec. 9, 2025

(54) CONTROLLER FOR ACTUATING A REDUNDANT ACTUATOR COMPRISING TWO SUB-ACTUATORS

(71) Applicant: Schaeffler Technologies AG & Co. KG, Herzogenaurach (DE)

(72) Inventor: Rene Hopperdietzel, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 228 days.

(21) Appl. No.: 18/290,349

(22) PCT Filed: May 16, 2022

(86) PCT No.: PCT/DE2022/100363
§ 371 (c)(1),
(2) Date: Nov. 13, 2023

(87) PCT Pub. No.: WO2022/242794
PCT Pub. Date: Nov. 24, 2022

(65) Prior Publication Data
US 2024/0253692 A1    Aug. 1, 2024

(30) Foreign Application Priority Data

May 18, 2021   (DE) ..................... 10 2021 112 819.6

(51) Int. Cl.
*B62D 5/00*    (2006.01)
*H02P 25/22*   (2006.01)
*H02P 29/028*  (2016.01)

(52) U.S. Cl.
CPC ............. *B62D 5/003* (2013.01); *B62D 5/006* (2013.01); *H02P 25/22* (2013.01); *H02P 29/028* (2013.01)

(58) Field of Classification Search
CPC ...... B62D 5/003; B62D 5/006; B62D 5/0403; B62D 5/0487; B62D 5/046; H02P 25/22; H02P 29/028; H02P 27/06; H02P 29/024
See application file for complete search history.

(56) References Cited

U.S. PATENT DOCUMENTS 9,899,948 B2   2/2018   Butzmann
10,232,874 B2  3/2019   Maeshima
(Continued)

FOREIGN PATENT DOCUMENTS

DE       19912169 A1    7/2000
DE    102016215762 A1    3/2018
(Continued)

*Primary Examiner* — Lindsay M Low
*Assistant Examiner* — Charles J Brauch

(57) ABSTRACT

A controller for actuating a motor with two separate windings. The controller includes: i) a first actuator connection having three first phase connections, (i) a second actuator connection having three second phase connections, iii) a first converter having three first phase outputs, iv) a second converter having three second phase outputs, v) a third converter having three third phase outputs, and iv) a switch device which is designed to: a) selectively connect each first phase connection of the first actuator connection to one of the first phase outputs of the first converter or to one of the third phase outputs of the third converter, and b) selectively connect each second phase connection of the second actuator connection to one of the second phase outputs of the second converter or to one of the third phase outputs of the third converter.

16 Claims, 1 Drawing Sheet

(56) References Cited

U.S. PATENT DOCUMENTS

| | | |
|---|---|---|
| 10,972,037 B2 | 4/2021 | Kim |
| 11,081,997 B2 | 8/2021 | Ohashi |
| 2011/0043152 A1 | 2/2011 | Kidokoro |
| 2016/0204728 A1 | 7/2016 | Notohara |
| 2016/0347180 A1 | 12/2016 | Steffani |
| 2020/0114964 A1 | 4/2020 | Kim |

FOREIGN PATENT DOCUMENTS

| | | | |
|---|---|---|---|
| DE | 112018001213 T5 | 11/2019 | |
| DE | 102021113541 A1 | 12/2022 | |
| JP | 6426426 B2 | 11/2018 | |
| WO | 2018135248 A1 | 7/2018 | |
| WO | 2019244212 A1 | 12/2019 | |
| WO | WO-2019243294 A1 * | 12/2019 | ............. H02P 25/22 |

* cited by examiner

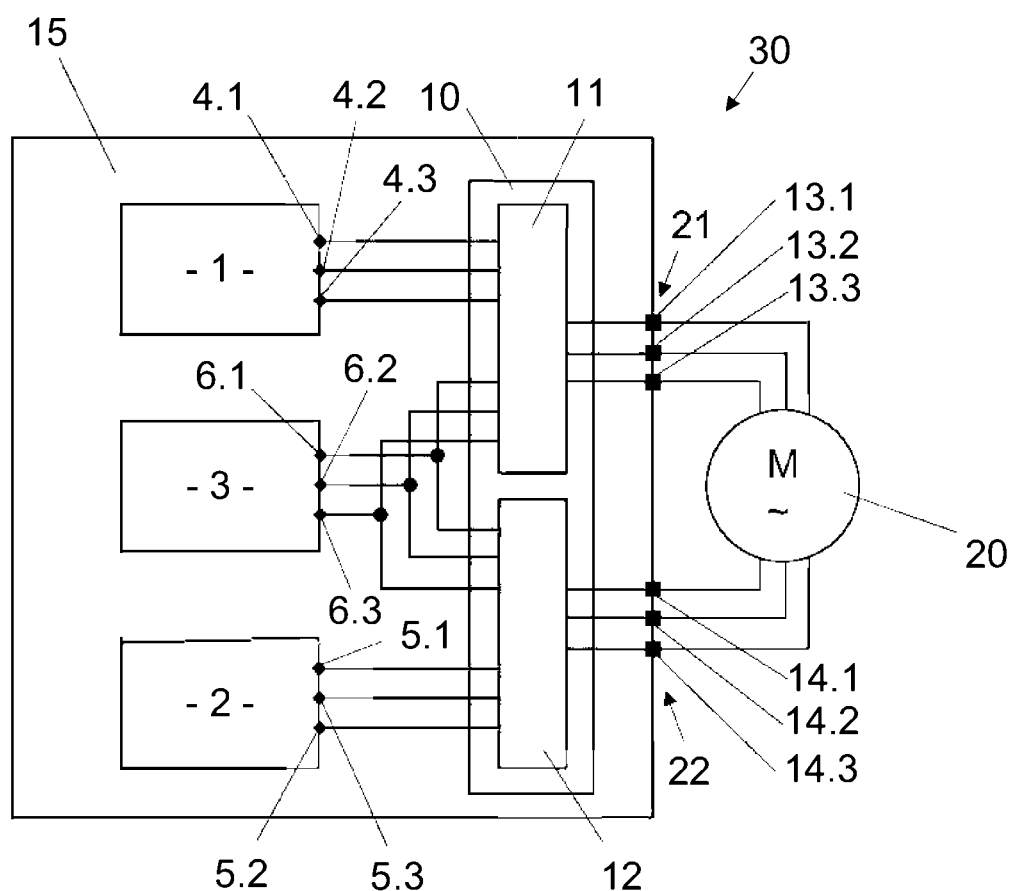

CONTROLLER FOR ACTUATING A REDUNDANT ACTUATOR COMPRISING TWO SUB-ACTUATORS

CROSS-REFERENCE TO RELATED APPLICATIONS

This application is the U.S. National Phase of PCT Application No. PCT/DE2022/100363 filed on May 16, 2022, which claims priority to DE 10 2021 112 819.6 filed on May 18, 2021, the entire disclosures of which are incorporated by reference herein.

TECHNICAL FIELD

The disclosure relates to a controller for actuating a redundant actuator with two sub-actuators, in particular a motor with two separate sets of windings. Furthermore, the disclosure relates to an actuator system, in particular for a steer-by-wire system, with a redundant actuator having two sub-actuators, in particular a motor having two separate sets of windings. The disclosure further relates to a method for actuating such a redundant actuator.

BACKGROUND

The disclosure can be used in the field of automobile construction, in particular in the field of steer-by-wire systems. In such steer-by-wire systems there is no mechanical connection between the steering wheel and the steered wheel. All steering commands are received by sensors on the steering wheel and transmitted electrically via a control unit to one or more steering actuators, which carry out the steering movements and transmit them to the wheels. In addition to these steering actuators, such steer-by-wire systems usually have an actuator for providing a force feedback torque on the steering wheel. Such force feedback actuators can provide the driver with the same steering feel, or the same haptic feedback, that the driver is used to from steering a vehicle with mechanically linked steering and power assistance.

It is known in the prior art to design actuators with redundancy. In this case, actuators with two sub-actuators are typically provided. An example of a redundant actuator that can be used as a force feedback actuator is an electric motor with two separate windings. To actuate such redundant actuators, controllers are used which can actuate the two sub-actuators. Such a controller can have a converter that selectively controls one of the two or both sub-actuators. However, it has been found to be disadvantageous that the actuation of the actuator, which is designed redundantly as such, is not possible if the converter of the controller fails.

SUMMARY

Against this background, the object is to increase the availability of a redundant actuator. The object is achieved by a controller for actuating a redundant actuator with two sub-actuators such as a motor with two separate sets of windings. The controller can include a first actuator connection, which comprises a plurality of, in particular three, first phase connections, and a second actuator connection, which comprises a plurality of, in particular three, second phase connections. The controller can also include a first converter having a plurality of, in particular three, first phase outputs, a second converter having a plurality of, in particular three, second phase outputs, and a third converter having a plurality of, in particular three, third phase outputs. Furthermore, the controller can include a switch device, which is configured:

i. to connect the first phase connections of the first actuator connection in each case optionally to one of the first phase outputs of the first converter or to one of the third phase outputs of the third converter or to one of the first phase outputs of the first converter and to one of the third phase outputs of the third converter, and ii. to connect the second phase connections of the second actuator connection in each case optionally to one of the second phase outputs of the second converter or to one of the third phase outputs of the third converter or to one of the second phase outputs of the second converter and to one of the third phase outputs of the third converter.

The controller according to the disclosure can include two actuator connections via which a plurality of phases of two sub-actuators can be connected. Furthermore, the controller can have three converters that can be connected to the two actuator connections in order to actuate sub-actuators connected to the actuator connections. The converters can be connected to the actuator connections via the switch device of the controller. This can connect the first phase connections of the first actuator connection in each case optionally to one of the first phase outputs of the first converter or to one of the third phase outputs of the third converter. It is also possible with the switch device to connect the second phase connections of the second actuator connection in each case optionally to one of the second phase outputs of the second converter or to one of the third phase outputs of the third converter. In this respect, the third converter can optionally be used to partially or completely replace the first and/or second converter. In the event of a defect in the first or second converter, it can be replaced by the third converter, with the phase outputs of the third converter being able to be connected to the phase connections of the corresponding actuator connection by means of the switch device. It is therefore possible to operate an actuator connected via the actuator connections at full power, i.e., via both actuator connections, even if one of the converters is defective. In the event of defects in two of the three converters, the actuator can be operated via one of the two actuator connections. Furthermore, it is possible to increase the power available at an actuator connection by connecting the third converter, in particular for a short time. The availability of a redundant actuator is thus increased by the controller according to the disclosure.

According to an example embodiment of the disclosure, the switch device can be configured in each case to connect a first phase connection of the first actuator connection independently of the other first phase connections to one of the first phase outputs of the first converter or to one of the third phase outputs of the third converter; and/or the switch device can be configured in each case to connect a second phase connection of the second actuator connection independently of the other second phase connections to one of the second phase outputs of the second converter or to one of the third phase outputs of the third converter.

By connecting a first phase connection of the first actuator connection independently of the other phase connections of the first actuator connection to one of the first or third phase outputs, it becomes possible to only partially replace the first converter with the third converter, for example only one phase of the first converter with one phase of the third converter. By connecting a second phase connection of the second actuator connection independently of the other phase connections of the second actuator connection to one of the second or third phase outputs, it becomes possible to only partially replace the second converter with the third converter, for example only one phase of the first converter with one phase of the third converter.

The switch device is particularly preferably configured to simultaneously connect a first phase connection of the first actuator connection to one of the phase outputs of the third converter and to connect a second phase connection of the second actuator connection to a further phase output of the third converter. Such an embodiment makes it possible to simultaneously replace two defective phases in the first converter and the second converter with phases of the third converter.

According to an example embodiment of the disclosure, the converters are inverters, in particular B6 inverters.

According to an example embodiment of the disclosure, the switch device has bidirectionally blocking switches, in particular bidirectionally blocking semiconductor switches.

The disclosure further relates to an actuator system, in particular for a steer-by-wire system, having a redundant actuator having two sub-actuators, in particular a motor having two separate sets of windings, and having a controller as described above.

The same advantages can be achieved with the actuator system as have already been described in connection with the controller according to the disclosure.

The redundant actuator can be a three-phase motor with two separate windings.

According to an example embodiment of the actuator system, the redundant actuator is designed as a force feedback actuator for providing a force feedback torque on a steering wheel. In this respect, haptic feedback can be generated on a steering wheel of a steer-by-wire system via the redundant actuator.

According to an example embodiment of the actuator system, the redundant actuator is designed as an actuator on a tie rod.

A method for actuating a redundant actuator having two sub-actuators, in particular a motor having two separate sets of windings, also contributes to achieving the object mentioned at the outset. A first sub-actuator can be connected to first phase connections of a controller and a second sub-actuator can be connected to second phase connections of the controller. Each of the first phase connections can initially be connected to a phase output of a first converter of the controller and each of the second phase connections can initially be connected to a phase output of a second converter of the controller. When a fault in the first converter is detected, at least one of the first phase connections is connected to a phase output of a third converter of the controller, and/or when a fault in the second converter is detected, at least one of the second phase connections is connected to a phase output of a third converter.

The same advantages can be achieved with the method as have already been described in connection with the controller according to the disclosure.

If a fault is detected in the first converter, all of the first phase connections can be connected to a phase output of the third converter of the controller and/or if a fault is detected in the second converter, all of the second phase connections can be connected to a phase output of the third converter.

According to an example embodiment of the method, when a fault is detected in the first converter, at least one other of the first phase connections remains connected to a phase output of the first converter of the controller. With such an embodiment of the method, a phase of the third converter can replace a defective phase of the first converter.

According to an example embodiment, when a fault is detected in the second converter, at least one other of the second phase connections remains connected to a phase output of the second converter of the controller. With such an embodiment of the method, a phase of the third converter can replace a defective phase of the second converter.

According to an example embodiment of the method, the third converter is initially not activated, i.e., before the fault is detected, and is only activated after the fault has been detected. Before the fault is detected, the third converter can be provided as a cold reserve, which is then activated when a fault has been detected.

BRIEF DESCRIPTION OF THE DRAWINGS

Further details and advantages of the disclosure will be explained below with reference to the exemplary embodiment shown in the drawings. In the drawings:

FIG. 1 shows an exemplary embodiment of an actuator system according to the disclosure with a redundant actuator and a controller in a block diagram.

DETAILED DESCRIPTION

The actuator system 30 shown in FIG. 1 comprises a redundant actuator 20 and a controller 15 for actuating the actuator 20. According to the exemplary embodiment, the actuator 20 is designed as an electric motor with two separate sets of windings. The separate sets of windings each form a sub-actuator of the redundant actuator and can be controlled independently of one another. The actuator system can be configured for use in a steer-by-wire system. In this case, the actuator 20 is a force feedback actuator for providing a force feedback torque on a steering wheel of the steer-by-wire system.

The controller 15 has a first actuator connection 21, which comprise a plurality of, here three, first phase connections 13.1, 13.2, 13.3. Furthermore, the controller 15 has a second actuator connection 22, which comprises a plurality of, here three, second phase connections 14.1, 14.2, 14.3. A first sub-actuator of the redundant actuator 20, here a first winding, is connected via the first actuator connection 21. A second sub-actuator of the redundant actuator 20, here a second set of windings, which is formed separately from the first set of windings, is connected via the second actuator connection 22.

As further components, the controller 15 comprises a first converter 1 having a plurality of, here three, first phase outputs 4.1, 4.2, 4.3, and a second converter 2 having a plurality of, here three, second phase outputs 5.1, 5.2, 5.3. Furthermore, a third converter 3 is provided, which has a plurality of, here three, third phase outputs 6.1, 6.2, 6.3. The converters 1, 2, 3 are designed as inverters, here B6 inverters. The converters 1, 2, 3 can be configured identically. The converters 1, 2, 3 are coupled to the two actuator connections 21, 22 of the control unit 10 via a switch device 10. The switch device 10 is designed in such a way that it can selectively adjust the connection between the two actuator connections and two of the three converters 1, 2, 3 in each case. The switch device 10 is configured to connect the first phase connections 13.1, 13.2, 13.3 of the first actuator connection 21 in each case optionally to one of the first phase outputs 4.1, 4.2, 4.3 of the first converter 1 or to one of the third phase outputs 6.1, 6.2, 6.3 of the third converter 3. In addition, the switch device 10 is configured to connect the second phase connections 14.1, 14.2, 14.3 of the second actuator connection 22 in each case optionally to one of the second phase outputs 5.1, 5.2, 5.3 of the second converter 2 or to one of the third phase outputs 6.1, 6.2, 6.3 of the third converter 3.

In this case, the connection established via the switch device 10 is established in such a way that a simultaneous connection of the third phase outputs both to the first phase connections 13.1, 13.2, 13.3 and to the second phase connections 14.1, 14.2, 14.3 is avoided.

According to the exemplary embodiment, the switch device 10 is divided into two sub-switch devices 11, 12, which in the manner of a multiplexer couple the phase outputs of two converters 1, 2, 3 in each case with an actuator connection 21, 22. Deviating from this, instead of such a sub-switch device 11, 12, two multi-phase, here three-phase, separating devices can be provided, which can optionally disconnect or conductively connect the phase outputs of the converter 1, 2, 3 from/to the actuator connection.

The switch device 10 comprises bidirectionally blocking switches, here bidirectionally blocking semiconductor switches, so that disconnection that is independent of the potential of the phase outputs and phase connections is possible.

The individual switches of the switch device 10 can be switched to a conducting or a blocking state independently of one another. In particular, the switch device 10 is configured to connect a first phase connection 13.1, 13.2, 13.3 of the first actuator connection 21 independently of the other first phase connections 13.1, 13.2, 13.3 to one of the first phase outputs 4.1, 4.2, 4.3 of the first converter 1 or to one of the third phase outputs 6.1, 6.2, 6.3 of the third converter 3. In addition, the switch device 10 is configured to connect a second phase connection 14.1, 14.2, 14.3 of the second actuator connection 22 independently of the other second phase connections 14.1, 14.2, 14.3 to one of the second phase outputs 5.1, 5.2, 5.3 of the second converter 2 or to one of the third phase outputs 6.1, 6.2, 6.3 of the third converter 3. It is therefore possible, for example, to connect a first phase connection 13.1 to the first converter and to connect the other two first phase connections 13.2, 13.2 to the third converter. Alternatively, two second phase connections 14.1, 14.2 can be connected to the second converter 2 and another second phase connection 14.3 to the third converter 3.

In the actuator system 30 according to the exemplary embodiment, a method for actuating a redundant actuator 20 with two sub-actuators can be used, wherein the first sub-actuator is connected to the first phase connections 13.1, 13.2, 13.3 of the controller 15 and the second sub-actuator being connected to the second phase connections 14.1, 14.2, 14.3 of the controller 15. The first phase connections 13.1, 13.2, 13.3 are initially—during normal operation—each connected to a phase output 4.1, 4.2, 4.3 of a first converter 1 of the controller 15. At the same time, the second phase connections 14.1, 14.2, 14.3 are initially each connected to a phase output 5.1, 5.2, 5.3 of a second converter of the controller 15. The third converter 3 is initially not activated during this normal operation and is kept as a cold reserve.

During this operation, a fault in the first converter 1 is detected, for example via a sensor system of the controller 15. In response to this fault detection, at least one of the first phase connections 13.1, 13.2, 13.3 is then connected to a phase output 6.1, 6.2, 6.3 of the third converter 3 of the controller 15. To actuate the actuator 20, at least one faulty phase of the first converter 1 is thus replaced by at least one phase of the third converter 3, or the entire first converter 1 is replaced by the third converter 3. Similarly, if a fault is detected in the second converter 2, at least one of the second phase connections 14.1, 14.2, 14.3 can be connected to a phase output 6.1, 6.2, 6.3 of the third converter.

As explained above, in the event of a fault, the switch device 10 can completely disconnect a converter 1, 2 from the actuator connection 21, 22 and instead connect the third converter to this actuator connection 21, 22. However, it is also conceivable that, when a fault is detected in the first converter 1, at least one of the first phase connections 13.1, 13.2, 13.3 remains connected to a phase output 4.1, 4.2, 4.2 of the first converter 1. In such an embodiment, the third converter 3 replaces only one or two phases of the, for example partially defective, first converter 1. In an analogous manner, if a fault is detected in the second converter 2, at least one of the second phase connections 14.1, 14.2, 14.3 can remain connected to a phase output 5.1, 5.2, 5.3 of the second converter 2.

The method described above and the actuator system 30 used in the process enable full functionality of the actuator system 30 in the event of a simple fault. If faults occur simultaneously in two converters 1, 2, 3, the actuator system 30 can continue to be operated with at least one converter 1, 2, 3. In this respect, the availability of the redundant actuator 20 is increased.

LIST OF REFERENCE SYMBOLS

1 Converter
2 Converter
3 Converter
4.1-4.3 Phase output
5.1-5.3 Phase output
6.1-6.3 Phase output
10 Switch device
11 Sub-switch device
12 Sub-switch device
13.1-13.3 Phase connection
14.1-14.3 Phase connection
15 Controller
20 Redundant actuator
21 Actuator connection
22 Actuator connection
30 Actuator system

The invention claimed is:

1. A controller for actuating a motor having two separate sets of windings, the controller comprising:
  a first actuator connection having a plurality of first phase connections,
  a second actuator connection having a plurality of second phase connections,
  a first converter having a plurality of first phase outputs,
  a second converter having a plurality of second phase outputs,
  a third converter having a plurality of third phase outputs, and
  a switch device configured to:
    selectively connect at least one of the plurality of first phase connections of the first actuator connection to: i) one of the plurality of first phase outputs of the first converter, or ii) to one of the plurality of third phase outputs of the third converter, or iii) to one of the plurality of first phase outputs of the first converter and to one of the plurality of third phase outputs the third converter, and selectively connect at least one of the plurality of second phase connections of the second actuator connection optionally to, i) one of the plurality of second phase outputs of the second converter, ii) to one of the plurality of third phase outputs of the third converter, or iii) to one of the plurality of second phase outputs of the second converter and to one of the plurality of third phase outputs of the third converter.

2. The controller according to claim 1, wherein the switch device is configured to connect:
one of the plurality of first phase connections of the first actuator connection independently of remaining ones of the plurality of first phase connections to: i) one of the plurality of first phase outputs of the first converter, or ii) one of the plurality of third phase outputs of the third converter; and
one of the plurality of second phase connections of the second actuator connection independently of remaining ones of the plurality of second phase connections to: i) one of the plurality of second phase outputs of the second converter, or ii) one of the plurality of third phase outputs of the third converter.

3. The controller 4, according to claim 1, wherein the first, second, and third converters are B6 inverters.

4. The controller according to claim 1, wherein the switch device has bidirectionally blocking semiconductor switches.

5. An actuator system for a steer-by-wire system, comprising:
a redundant actuator including a motor having two separate sets of windings, and
a controller according to claim 1.

6. The actuator system according to claim 5, wherein the redundant actuator is configured to provide a force feedback torque on a steering wheel.

7. A method for actuating a motor comprising two separate sets of windings, the method comprising:
connecting a first sub-actuator to a plurality of first phase connections of a controller, each of the plurality of first phase connections connected to a phase output of a first converter of the controller, and
connecting a second sub-actuator to a plurality of second phase connections of the controller, each of the plurality of second phase connections connected to a phase output of a second converter of the controller,
connecting at least one of the plurality of first phase connections to a phase output of a third converter of the controller when a fault is detected in the first converter, and
connecting at least one of the plurality of second phase connections to a phase output of the third converter when a fault is detected in the second converter.

8. The method according to claim 7, wherein when the fault is detected in the first converter, at least another one of the plurality of first phase connections remains connected to a phase output of the first converter of the controller.

9. The method according to claim 7, wherein when the fault is detected in the second converter, at least another one of the plurality of second phase connections remains connected to a phase output of the second converter of the controller.

10. The method according to claim 7, wherein:
the third converter is not activated before: i) the fault is detected in the first converter, and ii) the fault is detected in the second converter, and
the third converter is only activated after the fault in the first converter has been detected or the fault in the second converter has been detected.

11. A controller for actuating a motor having two separate sets of windings, the controller comprising:
a first actuator connection having three first phase connections,
a second actuator connection having three second phase connections,
a first converter having three first phase outputs,
a second converter having three second phase outputs,
a third converter having three third phase outputs, and
a switch device configured to:
selectively connect at least one of the three first phase connections of the first actuator connection, independently of any other one of the three first phase connections, to: i) one of the three first phase outputs of the first converter, or ii) to one of the three third phase outputs of the third converter, or iii) to one of the three first phase outputs of the first converter and to one of the three third phase outputs of the third converter, and
selectively connect at least one of the three second phase connections of the second actuator connection, independently of any other one of the three first phase connections, to: i) one of the three second phase outputs of the second converter, or ii) to one of the three third phase outputs of the third converter, or iii) to one of the three second phase outputs of the second converter and to one of the three third phase outputs of the third converter.

12. The controller according to claim 11, wherein the first, second, and third converters are B6 inverters.

13. The controller according to claim 11, wherein the switch device has bidirectionally blocking semiconductor switches.

14. The controller according to claim 11, wherein the third converter is configured to be activated only when a fault is detected in at least one of the first converter or the second converter.

15. The controller according to claim 11, further comprising a motor having two separate sets of windings.

16. The controller according to claim 15, wherein the motor is configured to provide force feedback torque on a steering wheel.

* * * * *